Dec. 4, 1956 E. A. STALKER 2,772,851
ROTOR CONSTRUCTION
Filed June 14, 1950 2 Sheets-Sheet 1

INVENTOR.
Edward A. Stalker

Dec. 4, 1956 E. A. STALKER 2,772,851
ROTOR CONSTRUCTION
Filed June 14, 1950 2 Sheets-Sheet 2

INVENTOR.
Edward A. Stalker

United States Patent Office 2,772,851
Patented Dec. 4, 1956

2,772,851
ROTOR CONSTRUCTION

Edward A. Stalker, Bay City, Mich., assignor to The Stalker Development Company, Bay City, Mich., a corporation of Michigan Application June 14, 1950, Serial No. 167,981

11 Claims. (Cl. 253—39)

The invention relates to rotors and blade structures for use in machines such as compressors, turbines, torque converters and the like wherein there is an interchange of energy between fluid and blades.

An object of the invention is to provide a means of repairing bladed rotors of the type fabricated from sheet metal.

Another object is to provide a rotor construction adapted to fabrication from sheet metal pressings commonly called stampings.

Still another object is to provide blades formed from sheet metal of airfoil sections having small nose radii.

Other objects will appear from the description, drawings and claims.

The above objects are accomplished by the means illustrated in the accompanying drawings in which—

Fig. 5 is a section along line 5—5 in Figs. 2 and 9;

In my copending application Ser. No. 42,565, entitled "Axial Flow Compressor Construction," filed August 5, 1948, now Patent No. 2,649,243, I have disclosed a blade structure adapted as a rotor, fabricated from sheet metal and substantially of integral construction for their blades and blade supporting plates.

The rotors disclosed herein are axial flow rotors. That is they have blades which receive the flow transversely across the leading edges along chordwise sections preferably of airfoil shape, and the spans of the blades extend radially. That is the leading and trailing edges are directed radially.

In the event that a blade is damaged it is desirable that a method of replacing the blade be available. The present invention provides a form of blade which can be used to replace a damaged blade. The blade structure is also adapted to the fabrication of a complete rotor of such blades.

Rotating machinery requiring a high power output for the size of the machine turn at very high rates of speed. Their stress problems are more severe than low speed machinery. The dividing line between low and high speed machinery may be taken at those blade tip speeds where ordinary materials of construction such as ordinary carbon steels will not suffice. Accordingly rotors whose blade tip speeds exceed 500 feet per second are classified as high speed machines.

Figure 1:
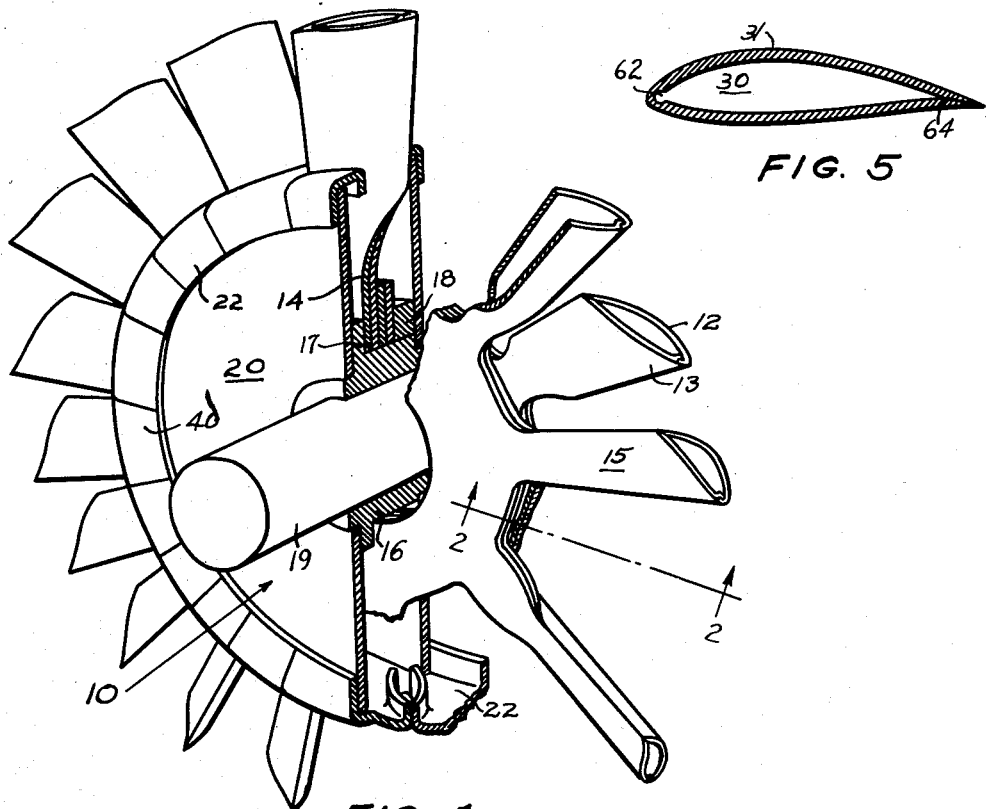
Fig. 1 is a fragmentary perspective of a rotor partly in section as initially formed but with one of the blades cut out to enable a replacement thereof to be made.
Figure 2:
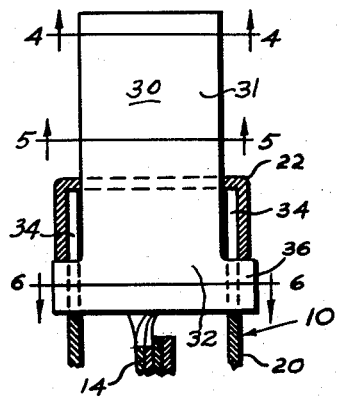
Fig. 2 is a fragmentary axial cross section through the rotor of Fig. 1 with a repair blade installed on the line 2—2 of Fig. 1 with the repair blade being shown in elevation.
Figure 3:
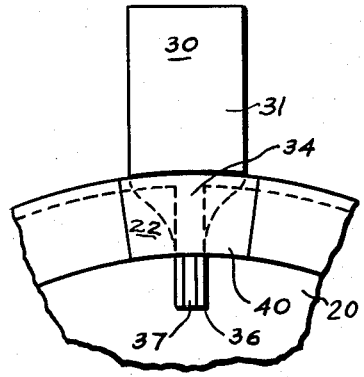
Fig. 3 is a fragmentary axial view of the rotor of Fig. 2.
Figure 4:
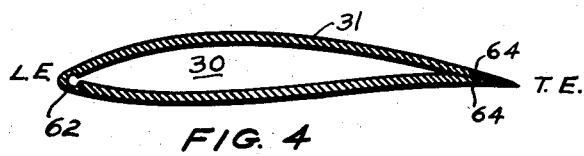
Fig. 4 is a section along the line 4—4 in Fig. 2.
Figure 6:
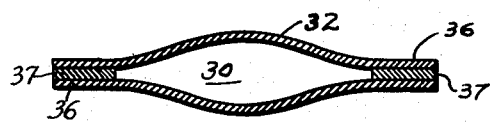
Fig. 6 is a section along line 6—6 in Figs. 2 and 9.
Figure 7:
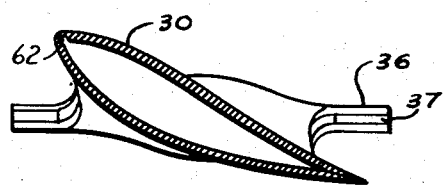
Fig. 7 is a spanwise view of a blade along line 7—7 in Fig. 9.
Figure 8:
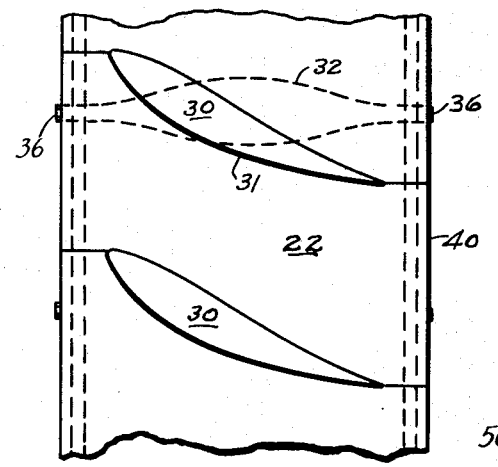
Fig. 8 is a radial view of a fragment of the hub peripheral surface of the rotor of Fig. 2.

Referring now to the drawings Fig. 1 shows a rotor 10 comprised of a group of sheet metal plates indicated generally as hub plates. This group comprises the blade supporting plates 14 and the side plates or disks 20. The blade parts 12 and 13 are integral with the blade supporting plates 14 and form blades 15. The hub covering segments or rim closure between blades are 22 constituting a rim closure means. The plates and the rim closure means constitute parts of the hub structure 16 which also includes suitable hub rings 17 and 18 for fixing the plates to the driving shaft 19.

Where a blade is damaged it may be cut out and a new blade 30 substituted as shown in Fig. 2. New rim closures then are used to replace those removed. As shown in Figs. 2–8 the blade has the hollow blade body 31 of airfoil section and the hollow root body 32 twisted or pitched to be transverse to the side plates 20. Thus if the slots 34 are cut radially inward in the hub plates the blade flanges 36 can be inserted from the periphery. The flanges 36 of the blades together with the insert 37 then nest in the slots 34. The flanges 40 of the rim closure 22 cover and extend across the slots 34 to carry the peripheral stress from one side of the slot to the other. The flanges 36 and 40 are bonded to the side plates by soldering or welding or some such fusing process, preferably by copper, silver solder or other high melting point solder. The covering segments are also soldered to the blades. As shown in Figs. 2 and 3 the flanges 36 protrude out of the side plates below the flanges 40 and bear thereon for support in addition to the bonded joints.

In high temperature soldering where strength of the joint must be assured it is important that the joint be accessible to visual inspection. This is difficult to do but is provided in the present invention.

By lapping or faying the sheet metal parts they can be soldered together so that the soldered surfaces are subject principally to shear stress and the parts can be light in weight for adequate strength.

In order to carry the centrifugal loads of the blades and rim closures and be of light weight, the side plates are made straight as seen in axial section.

Figure 10:
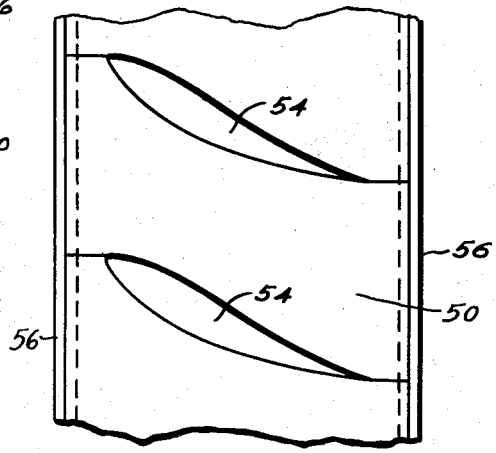
Fig. 10 is a radial view of a fragment of the hub peripheral surface of the rotor of Fig. 9 disclosing the blade openings.
Figure 9:
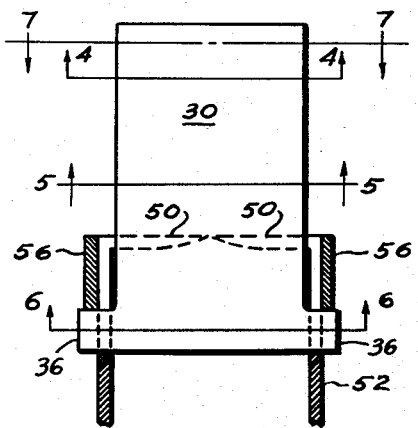
Fig. 9 is a fragmentary axial section through another form of rotor.

A complete rotor may be constructed of blades like 30 and this may be quite economical for varying quantities of production. An axial fragmentary section of such a rotor is shown in Fig. 9. In this structure the rim closures are formed by the peripheral rim flanges 50 of the supporting side plates 52. The flanges are slotted to receive the blades as shown in Figs. 9 and 10 where the openings 54 conform to the blade contour. Rings 56 extend about the side plates 52 above the blade flanges 36.

Figure 11:
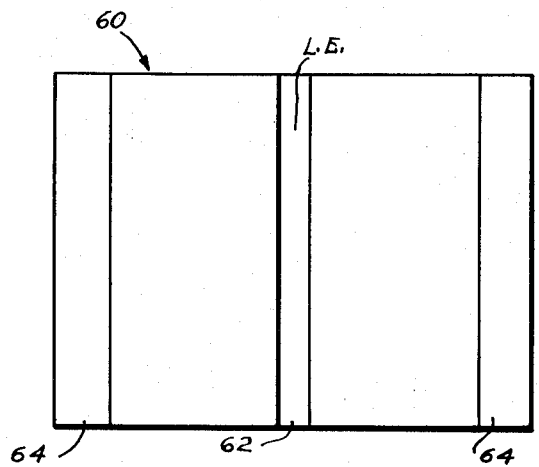
Fig. 11 is a development of the sheet from which a blade is fabricated.
Figure 12:
Fig. 12 is an end view of the sheet of Fig. 11.

The blades are made from a sheet of metal 60, alloy steel for instance, by folding about the leading edge L. E. and bonding the two side walls together at the trailing edge T. E. When very thin air-foil sections are used it is difficult to provide the small radius at the leading edge. In the present invention the surface of sheet metal which is to form the leading edge or nose wall is thinned, as by rolling for instance, along a narrow spanwise band or groove 62, Figs. 4, 11 and 12. The edges of the nose groove are close together in the formed condition of the blade adapting it to be secured with solder. At the same time the edges of the sheet may be given the taper 64 to provide a sharp trailing edge when the sheet edges are lapped. It is simpler and far more economical to provide the taper on the sheet than to finish the individual blades after the edges are bonded together. The bonding is preferably done by soldering, preferably furnace soldering. Silver solder, copper, or some of the still higher melting type solders may be used.

In contemporary practice the blades and their hubs are so heavy that a heavy rim on the rotor disk is necessary to carry the centrifugal loads of the blades. For instance in many blades the blade root fitting weighs as much or more than the blade. Furthermore the blade root fitting is bulky, requiring further increase in the size of the disk rim. Then the thickness of the disk adjacent to the rim has to be made heavy to carry not only the blade loads but also the extra load from the rim made heavy by the type of blade and its root fitting and effects thereof.

If proper proportions are used a rotor fabricated according to this invention from sheet metal pressings can be lighter by about 40% than a machined rotor following contemporary practice. That is if the blade is made with a wall of limited thickness, as is practical according to this invention, and the blade is then attached without a heavy blade root fitting or comparable means requiring a disk rim, then the disk rim can be dispensed with and the disk itself can be very thin such as pieces of sheet metal.

In this invention the blades or blade walls are attached directly to the load carrying disks or plates of the rotor thus eliminating the blade root fittings, and the heavy disk rim.

The blade wall thickness can be of the order of 1.5% of the blade chord length or less, preferably less than about 1% of the chord length.

Thus the blade wall thickness can be of the order of 0.020 in. or less depending on the size of the blade. For instance a blade having a root chord of 2 in. can readily employ a wall thickness of 0.018 in. If such a blade is fixed to rotor side plates by soldering as described herein, no disk or plate rim is necessary. The thin walled blade and the light rim, or absence of a rim, makes possible side disks or plates whose thickness aggregate a total thickness less than 10 times the blade wall thickness.

The thickness of the portions of the plates where the blades are attached need not be greater than the portion next adjacent thereto radially inward therefrom.

When the blades are made hollow of thin sheet metal and thereby of limited weight the blade bases may be omitted, and the rim structure can be of limited weight and thickness comparable to the blade wall thickness; the disks can consequently be made of limited thickness and weight, and all these parts will be able to sustain their own centrifugal load and the centrifugal loads accumulated on them inward from the tips of the blades with sheet metal thicknesses of the order of the blade wall thickness.

It will thus be clear that the blades, the rim closures and the disks cooperate to make the rotor as a whole of desirably low weight.

This invention refers to compressor rotors for elastic fluids. The bladed wheels making up such rotors have a substantial static pressure rise along the flow passages between blades from leading to trailing edges thereof. To provide for this pressure rise the passages must have closed peripheral surfaces extending between the blades and from the leading to the trailing edges thereof. At the radially inner ends of the passages the rim segments sustain the static pressure while at the outer ends the case performs this function.

Furthermore, since there is a substantial pressure rise from front to rear of the wheel the ratio of the hub radius to the blade tip radius is relatively large, of the order of 0.5 or more and preferably 0.6 or more, so that the pressure difference between front and rear sides can be sustained without a return flow at the hub. For a similar reason the blades are peripherally close together, preferably about one chord length or less apart.

The joining of the sheet metal blades and the sheet metal hub structure is done by soldering, preferably furnace soldering simultaneously on all joints. These are such that the joint is exposed to view so that the assembly is inspectable after removal from the furnace.

While I have illustrated specific forms of the invention, it is to be understood that variations may be made therein and that I intend to claim my invention broadly as indicated by the appended claims.

What is claimed is:

1. In combination in a compressor rotor, a hub structure, axially spaced disk shaped side plates fixed at their radially inner portions to said hub structure, each said plate having a slot extending radially inward from the periphery thereof, a hollow blade having chordwise extending flanges along the leading and trailing edges of the root portion thereof fitting into respective said slots in opposite plates, each said flange being bonded to the walls of its respective said slot, and peripherally extending segments radially outward of and in centrifugal load supporting relation with said flanges and bonded to each side plate across said slot to transmit peripheral stress thereacross.

2. In combination in an axial flow rotor adapted for the interchange of energy with a fluid, a hub structure comprising axially spaced sheet metal side plates, a plurality of hollow formed sheet metal blades spaced peripherally about said structure with their leading and trailing edges extending radially, means fixing said blades over a substantial flat surface thereof to said side plates, and a plurality of rim closures each extending between said plates and the root ends of adjacent blades, each said closure having a flange at opposite ends extending radially inward and faying with the surface of a side disk and fused thereto.

3. In combination in a fluid turning blade for mounting upon a rotor but having side plates, a blade upper wall and a blade lower wall integral therewith across a line of bending, said walls being juxtaposed to define a hollow blade and having radially inwardly extending root portions, means fusing said walls together, an attachment element positioned between the root portion of said walls and fused thereto, said element attachment having spanwise extending flanges of formed sheet metal presenting substantially flat surface areas of substantial extent in contact with said plate and being bonded thereto over said areas by fused metal in shear to sustain said blade with minimum structural weight.

4. In combination in an axial flow compressor rotor adapted for rotation about an axis to discharge fluid in the general axial direction, a hub structure comprising axially spaced sheet metal plates, a peripheral flange extending axially to provide rim closure to said hub structure, a plurality of hollow pressed metal blades peripherally spaced about said hub structure, said flange having openings therein each to accommodate the passage of a blade inner end portion into said hub between said plates, each said end portion having flanges on opposite sides thereof, and means fixing said flanges to said sheet metal plates over a substantial overlapping area thereof.

5. In combination, a hollow sheet metal compressor blade body of airfoil section having side walls and a nose wall integral therewith of relatively narrow chordwise width and of a thickness substantially less than the thickness of the side wall adjacent said nose wall defining a narrow spanwise groove, said side walls being folded toward each other relative to said nose about a radius less than the thickness of a said side wall, the edges of the sides of said groove being closely adjacent to each other adapting said groove to be filled with solder or the like.

6. In combination in an axial flow elastic fluid compressor rotor adapted to increase the pressure and density of a fluid in the rotor flow passages, a hub structure adapted for rotation about an axis, said structure comprising axially spaced sheet metal side plates of limited thickness and a sheet metal rim closure means, a plurality of hollow sheet metal blades supported on said structure and spaced peripherally thereabout to define between said blades a plurality of flow passages each having an exit facing rearward in the general axial direction, said rim closure means extending between said blades and between said plates, each said blade extending radially inward through said rim closure means and having flat surface areas in face to face contact with said side plates, each said blade having walls of limited thickness of the order of one percent of the blade chord length to reduce the centrifugal load of each said blade, and fused metal means for bonding the walls of the several blades to said side plates along a substantial extent of said flat overlying areas extending radially inward from the perimeters of said plates.

7. In combination in an axial flow compressor rotor adapted to increase the pressure and density of a fluid in the rotor flow passages, a hub structure comprising axially spaced sheet metal side plates, a plurality of hollow blades formed from a sheet of metal suitably shaped and folded upon itself to define a plurality of circumferentially spaced hollow blades extending radially outwardly beyond said plates and having root portions extending radially inwardly of said side plates and secured to the faces thereof over a substantial area of contact, at least one of said blades being removed, and a repair blade in place of said removed blade having radially inner parts projecting axially toward and located adjacent said side plates, said root portions being joined to said side plates by fused metal to retain said blades in said hub structure against the effects of centrifugal force in use.

8. In combination in an axial flow elastic fluid compressor rotor, a hub structure comprising axially spaced sheet metal side plates, a plurality of hollow sheet metal blades spaced peripherally about said structure with their leading and trailing edges extending radially and having radially inner root portions in face to face contact with said side plates over a substantial area, means fixing said contacting root portions to said side plates, and a plurality of rim closures each extending between said plates and the root ends of adjacent blades, each said closure having radially directed flanges at front and rear thereof faying with their respective side plates and radially directed flanges at peripherally opposite ends directed radially inward and faying with the adjacent surfaces of said blades, said flanges being bonded to their respective adjacent surfaces by fused metal.

9. A light weight rotor for an axial flow elastic fluid machine in which energy is exchanged with a fluid flow comprising a separately fabricated hub member for receiving a driving torque, a hub plate fixed to said hub member by fused metal and extending radially outward therefrom, a plurality of angularly fixed blades of hollow sheet metal construction fixed directly to said hub plate over a substantial contacting area thereof providing light weight thereof and limiting the centrifugal forces developed therein during operation at high tip speeds with accompanying flow of said fluid in a generally axial direction, said plurality including at least one separately fabricated blade, a rim closure fixed to said plate and extending between and closely conforming with the walls of said blades between the leading and trailing edges thereof to sustain a substantial difference in static pressure and density in said fluid flowing between said blades, and a part connecting to said separately fabricated blade and extending inward of said rim closure to said hub plate and being fixed thereto at a locality radially outward from said hub member and radially inward from said rim closure for supporting said blade in operative position on said rotor.

10. In a light weight axial flow compressor rotor, a rim closure means, a plurality of angularly fixed separately fabricated blades peripherally spaced about said rim closure means with their leading and trailing edges extending radially outward therefrom, said blades being of hollow sheet metal construction providing low weight and limiting the centrifugal forces developed therein during operation at high tip speeds with accompanying flow of said fluid in a generally axial direction with increased density and pressure, said rim closure means being of light weight hollow sheet metal construction extending between said blades and from front to rear thereof to sustain said increase in density and pressure and developing limited centrifugal forces at the root ends of said blades, each said blade having a part connected thereto and extending radially inward through said rim closure means, and sheet metal hub means fixed to said parts by fused metal over a substantial contacting area thereof subject to stress in shear to sustain said limited centrifugal forces of said parts directly by said hub means, said rim closure means being fixed to said hub means to be sustained thereby.

11. In combination in an axial flow elastic fluid compressor rotor adapted to increase the pressure and density of a fluid in the rotor flow passages, a plurality of separately fabricated hollow pressed sheet metal blades spaced peripherally about said rotor to define a plurality of flow passages therebetween each having an exit facing rearward in the general axial direction, a rim closure extending between adjacent said blades from front to rear thereof to sustain said increase in pressure and density, each said blade having a wall thickness of the order of one percent of the blade chord length to limit the centrifugal load at the root portions thereof, and a thin sheet metal plate in contact over a substantial surface area with said root portions of said blades and fixed thereto by fused metal in shear to sustain said centrifugal loads from said plurality of blades, said sheet metal plate being connected to said rim closure for the support thereof.

References Cited in the file of this patent

UNITED STATES PATENTS

| | | |
|---|---|---|
| 2,118,499 | Durbin | May 24, 1938 |
| 2,222,787 | Stadler | Nov. 26, 1940 |
| 2,415,847 | Redding | Feb. 18, 1947 |
| 2,431,064 | McKee | Nov. 18, 1947 |
| 2,436,087 | Benson | Feb. 17, 1948 |
| 2,440,127 | Stulen | Apr. 20, 1948 |
| 2,494,658 | Highberg | Jan. 17, 1950 |
| 2,500,071 | Hans | Mar. 7, 1950 |
| 2,501,038 | Fransson | Mar. 21, 1950 |
| 2,503,072 | Schneider | Apr. 4, 1950 |
| 2,537,739 | Chilton | Jan. 9, 1951 |
| 2,559,131 | Oestrich et al. | July 3, 1951 |
| 2,573,875 | Riddiford | Nov. 6, 1951 |
| 2,601,969 | Eastman | July 1, 1952 |
| 2,657,008 | Atkinson | Oct. 27, 1953 |

FOREIGN PATENTS

| | | |
|---|---|---|
| 538,547 | Great Britain | Aug. 7, 1941 |